(12) United States Patent
Haartsen (10) Patent No.: US 6,345,066 B1
(45) Date of Patent: Feb. 5, 2002

(54) REDUCTION OF ACCESS TIME DELAY IN FREQUENCY-HOPPING RADIO SYSTEMS USING A DIRECT SEQUENCE MODE

(75) Inventor: Jacobus Cornelis Haartsen, Borne (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/273,545

(22) Filed: Mar. 22, 1999

Related U.S. Application Data (60) Provisional application No. 60/085,967, filed on May 19, 1998.

(51) Int. Cl.[7] .............................................. H01L 27/30
(52) U.S. Cl. ...................... 375/130; 375/131; 375/132; 375/140; 370/320; 370/335; 370/342
(58) Field of Search ................................. 375/130, 131, 375/132, 133, 134, 137, 140, 141, 145, 149, 354; 370/320, 335, 342, 344, 343, 503

(56) References Cited

U.S. PATENT DOCUMENTS

| | | | |
|---|---|---|---|
| 5,008,899 A | * | 4/1991 | Yamamoto ...................... 375/1 |
| 5,222,098 A | | 6/1993 | Yamamoto et al. |
| 5,339,331 A | * | 8/1994 | Beauchamp et al. ........... 375/1 |
| 5,528,623 A | | 6/1996 | Foster, Jr. |
| 5,822,362 A | * | 10/1998 | Friedmann ................... 375/200 |
| 5,926,501 A | * | 7/1999 | Souissi et al. ............... 375/200 |
| 6,115,408 A | * | 9/2000 | Gendel et al. ............... 375/132 |
| 6,173,004 B1 | * | 1/2001 | Ohashi ........................ 375/132 |
| 6,223,053 B1 | * | 4/2001 | Friedmann et al. ......... 455/552 |

FOREIGN PATENT DOCUMENTS

| | | |
|---|---|---|
| JP | 10070490 | 10/1998 |

OTHER PUBLICATIONS

Atsushi Hoshikuki, et al., "Implementation of an Industrial R/C System Using a Hybrid DS/FH Spread Spectrum Technique," IEICE Transactions on Communications, vol. E76–B, No. 8, Aug. 1, 1993, pp. 984–988.

* cited by examiner

*Primary Examiner*—Stephen Chin
*Assistant Examiner*—Dac V. Ha
(74) *Attorney, Agent, or Firm*—Burns, Doane, Swecker & Mathis, L.L.P.

(57) ABSTRACT

In a radio system that employs frequency hopping (FH), access time delay is reduced, without compromising processing gain, by adding direct-sequence (DS) spreading to the system. This results in a hybrid FH/DS system, wherein the use of DS spreading permits a reduction in the number of hop frequencies used during start-up. Once synchronization is achieved, pure FH spreading, rather than the hybrid FH/DS spreading, along with a greater number of hop frequencies are used.

28 Claims, 8 Drawing Sheets

REDUCTION OF ACCESS TIME DELAY IN FREQUENCY-HOPPING RADIO SYSTEMS USING A DIRECT SEQUENCE MODE

CROSS-REFERENCE TO COPENDING APPLICATION

This application claims priority under 35 U.S.C. §§119 and/or 365 to Ser. No. 60,085,967 filed in the United States on May 19, 1998; the entire content of which is hereby incorporated by reference.

This application claims the benefit of U.S. Provisional Application No. 60/085,967, filed May 19, 1998.

BACKGROUND

The invention relates to radio systems that apply frequency hopping spread spectrum techniques, and more particularly to methods and apparatuses for speeding up the frequency-hop synchronization between units of frequency hopping systems at the time of connection setup.

In the last several decades, progress in radio and Very Large Scale Integrated circuit (VLSI) technology has fostered widespread use of radio communications in consumer applications. Portable devices, such as mobile radiotelephones, can now be produced having acceptable cost, size and power consumption.

Although wireless technology is today focused mainly on voice communications (e.g., with respect to handheld radios), this field will likely expand in the near future to provide greater information flow to and from other types of nomadic devices and fixed devices. More specifically, it is likely that further advances in technology will provide very inexpensive radio equipment which can be easily integrated into many devices. This will reduce the number of cables currently used for many applications. For example, radio communication can eliminate or reduce the number of cables used to connect master devices with their respective peripherals.

The aforementioned radio communications will require an unlicensed band with sufficient capacity to allow for high data rate transmissions. A suitable band is the so-called Industrial, Scientific and Medical (ISM) band at 2.4 GHz, which is globally available. The ISM band provides 83.5 MHZ of radio spectrum.

To allow different radio networks to share the same radio medium without coordination, signal spreading is usually applied. In fact, the Federal Communications Commission (FCC) in the United States currently requires radio equipment operating in the 2.4 GHz band to apply some form of spectrum spreading technique when the transmit power exceeds about 0 dBm. Spread spectrum communication techniques, which have been around since the days of World War II, are of interest in today's commercial applications because they provide robustness against interference, which allows for multiple signals to occupy the same bandwidth at the same time.

Spreading can either be at the symbol level by applying direct-sequence (DS) spread spectrum techniques or at the channel level by applying frequency hopping (FH) spread spectrum techniques. In DS spread spectrum, the informational data stream to be transmitted is impressed upon a much higher rate data stream known as a signature sequence. Typically, the signature sequence data are binary, thereby providing a bit stream. One way to generate this signature sequence is with a pseudo-noise (PN) process that appears random, but can be replicated by an authorized receiver. The informational data stream and the high bit rate signature sequence stream are combined to generate a stream of so-called "chips" by multiplying the two bit streams together, assuming the binary values of the two bit streams are represented by +1 or −1. This combination of the higher bit rate signal with the lower bit rate data stream is called spreading the informational data stream signal. Each informational data stream or channel is allocated a unique signature sequence. At the receiver, the same unique signature sequence is used to recover the underlying informational data stream signal.

In frequency hopping systems, the spreading is achieved by transmitting the informational data stream over ever-changing radio frequencies. For each communication, the particular frequencies used by both the transmitter and receiver are determined by a predefined frequency hop sequence.

The use of frequency hopping is attractive for the radio applications mentioned above because it more readily allows the use of cost effective radios. However, FH systems are less appropriate when a connection has to be established quickly. This is because, in order to communicate, a FH transmitter and receiver must be hop synchronized so that both use the same hop channel at the same time. Prior to synchronization, the transmitter may have no knowledge of which hop channel the recipient will listen in on and when. During the synchronization process, the uncertainty in both time and frequency must be resolved. This problem becomes more difficult when the number of hop frequencies used in the FH system increases because when the number of frequencies in the synchronization procedure increases, the uncertainty in frequency increases and the amount of time required to establish synchronization will increase as well, thus delaying the access time.

There is therefore a need for techniques to reduce the access delay in FH systems such that the uncertainty in time and frequency can be resolved quickly.

SUMMARY

The foregoing and other objects are achieved in methods and apparatuses for use in communication systems. In accordance with one aspect of the invention, a hybrid frequency hopping/direct sequence spread-spectrum mode of communication is employed during startup of a connection. Furthermore, a pure frequency hopping spread-spectrum mode of communication is employed during a connected mode of the connection.

In another aspect of the invention, the chip rate utilized in the hybrid frequency hopping/direct sequence spread-spectrum transmission mode of communication is identical to a bit transmission rate used by the pure frequency hopping spread-spectrum transmission mode of communication.

In still another aspect of the invention, a page message is sent by means of the hybrid frequency hopping/direct sequence spread-spectrum transmission mode of communication during startup of the connection. In one embodiment, the page message may comprise a fixed chip sequence that is unique to a radio unit being paged. In an alternative embodiment, the page message may comprise a fixed chip sequence that is common to all radio units in the radio system.

In yet another aspect of the invention, a chip rate of the page message may be identical to a bit rate used during the pure frequency hopping spread-spectrum transmission mode of communication.

In still another aspect of the invention, a sliding correlator may be used to despread the page message that is transmitted during startup of the connection. In some embodiments, the sliding correlator may be implemented as a tapped delay line.

In yet another aspect of the invention, a processing gain of the hybrid frequency hopping/direct sequence spread-spectrum transmission mode of communication may equal or exceed 17 dB.

In still another aspect of the invention, the hybrid frequency hopping/direct sequence spread-spectrum transmission mode of communication used during startup of the connection utilizes a first hop rate, and the pure frequency hopping spread-spectrum transmission mode of communication during a connected mode of the connection utilizes a second hop rate, wherein the first hop rate is a multiple of the second hop rate.

In yet another aspect of the invention, the pure frequency hopping spread-spectrum transmission mode of communication utilized during a connected mode of the connection uses a hop sequence that comprises at least 75 hop frequencies.

In still another aspect of the invention, the hybrid frequency hopping/direct sequence spread-spectrum transmission mode of communication used during startup of the connection utilizes a first hop sequence; and the pure frequency hopping spread-spectrum transmission mode of communication used during a connected mode of the connection uses a second hop sequence, wherein the first hop sequence consists of fewer hop frequencies than are defined by the second hop sequence.

In yet another aspect of the invention, a transceiver may be operated in a radio system by employing a hybrid frequency hopping/direct sequence spreadspectrum mode of communication during a first mode of operation on a connection; and employing a pure frequency hopping spread-spectrum mode of communication during a second mode of operation of the connection, wherein a first hop sequence for use by the hybrid frequency hopping/direct sequence spread-spectrum mode of communication consists of fewer hop frequencies than are defined by a second hop sequence for use by the pure frequency hopping spread-spectrum mode of communication.

BRIEF DESCRIPTIONS OF THE DRAWINGS

The objects and advantages of the invention will be understood by reading the following detailed description in conjunction with the drawings in which.

DETAILED DESCRIPTION

The various features of the invention will now be described with respect to the figures, in which like parts are identified with the same reference characters.

Since the ISM bands at 900 MHZ and 2400 MHZ have been opened for commercial applications, many products have been introduced providing wireless communications in these bands. The usage of the band is restricted in the U.S. by the Part 15 rules of the FCC and in Europe by the ETS 300 328 of the ETSI. In other countries throughout the world, similar rules apply. In short, the rules require the systems to spread their power over the band not only in order to spread interference at the transmit side, but also to obtain interference immunity at the receive side. Spreading can be obtained either by frequency-hop (FH) spreading or by direct-sequence (DS) spreading, each of which is a well known spreading technique in communications theory. Both spreading methods have their merits and drawbacks. With the current state-of-the-art, FH spreading results in less-complex and cheaper radio transceivers than DS spreading.

Figure 1:
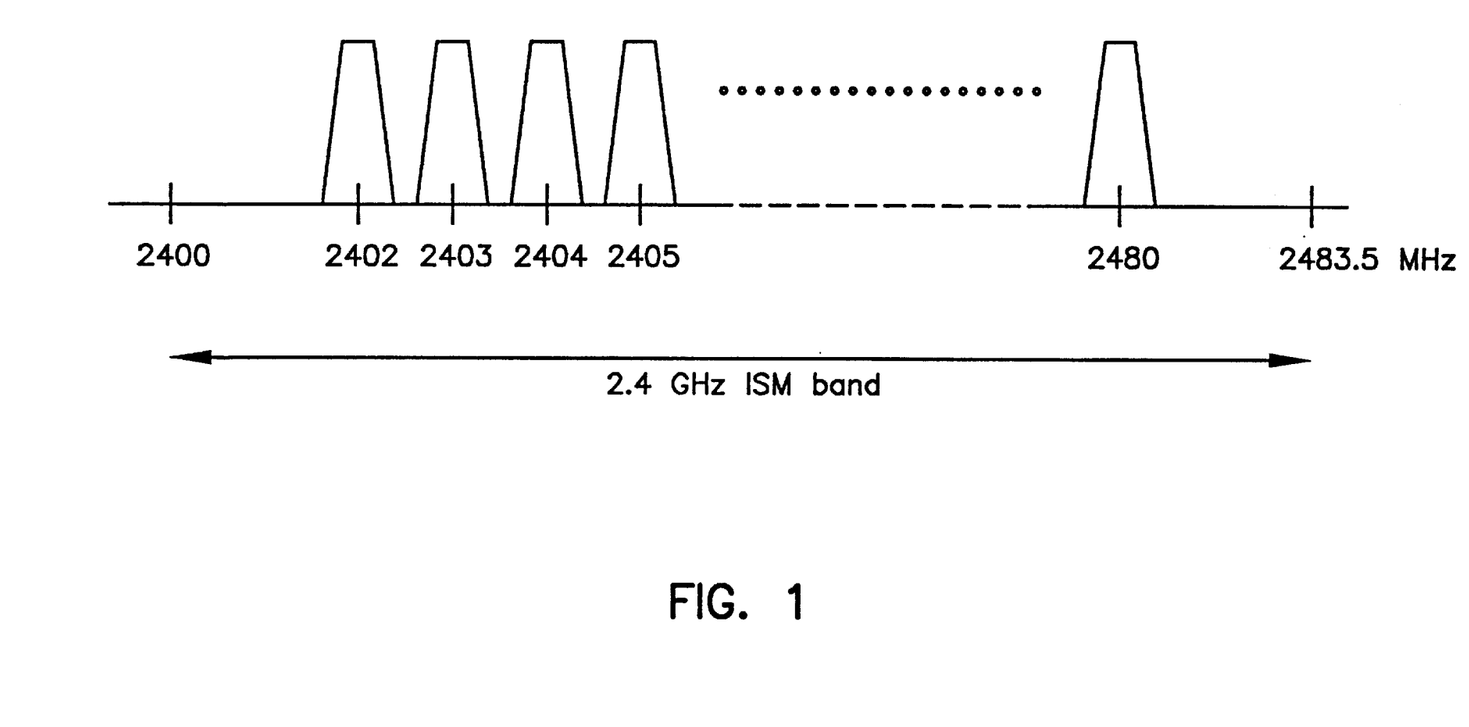
FIG. 1. is an example of traffic carrier allocation in 2.4 GHz ISM band.
Figure 2:
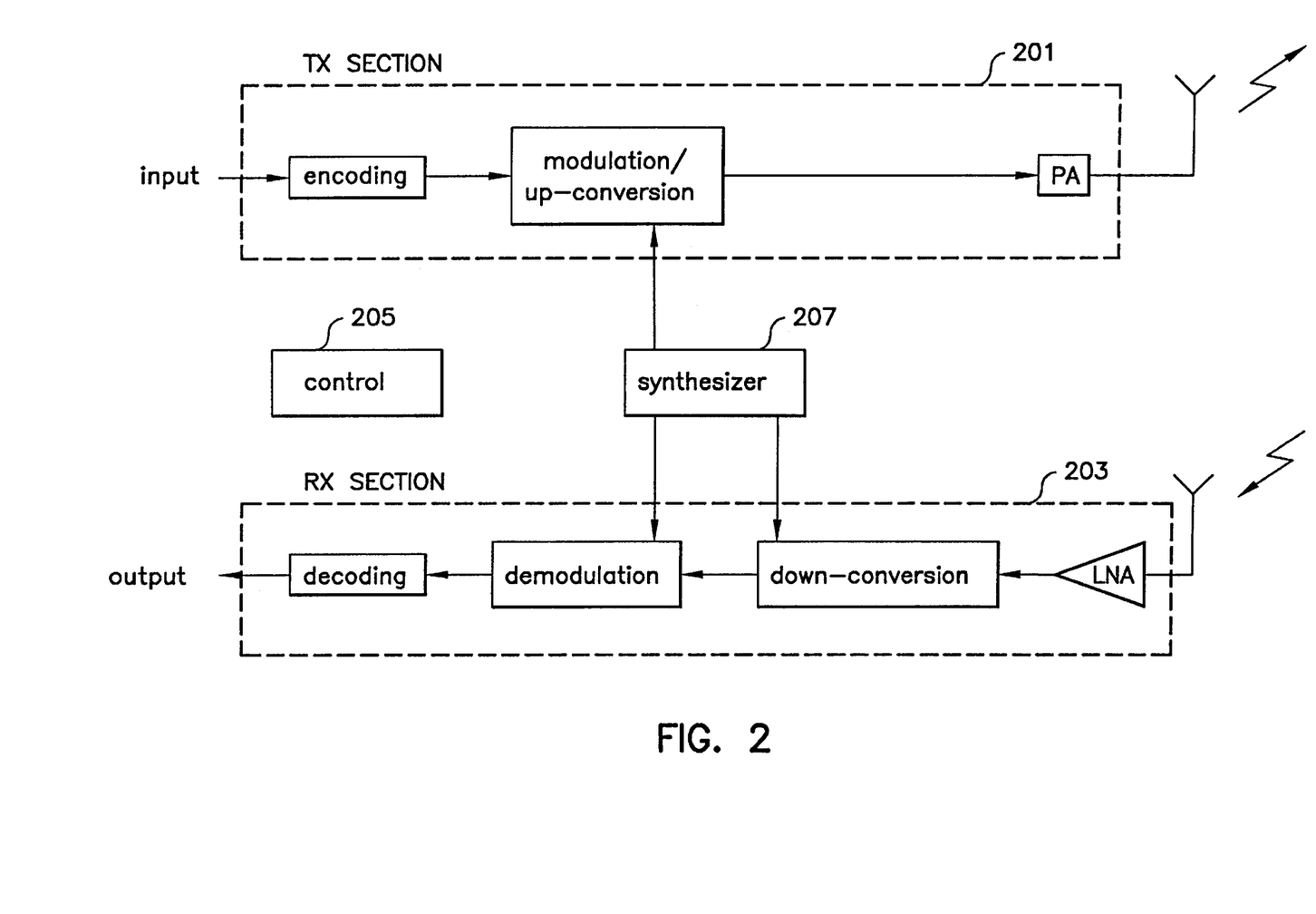
FIG. 2. is a schematic diagram of a transmitter and receiver for a FH radio system.

FH systems operating in the U.S. in the 2.4 GHz band are required to use at least 75 hop frequencies. Recently, a standard has been developed by the IEEE (namely, IEEE 802.11) for use in Wireless Local Area Network (WLAN) applications. Both a FH version and a DS version have been defined. For the FH version, the ISM band at 2.4 GHz, which ranges from 2400 MHZ to 2483.5 MHZ, is divided into 79 hop channels spaced at 1 MHZ intervals, as illustrated in FIG. 1. Two or more radio units that communicate, hop from one channel to another channel according to a pseudo-random hop pattern which is used by all connected radio units. As long as the units are hop synchronized, they will simultaneously use the same channel, and thus stay in contact. A general schematic for a radio transceiver used for a FH system is shown in FIG. 2. The various components shown in the transmission (TX) section 201 and the Receive (RX) section 203 are well-known, and need not be described here in detail. Of pertinence to this discussion is the fact that a controller 205 causes a frequency synthesizer 207 to generate frequencies in accordance with a particular hop sequence for use in modulation/up-conversion and demodulation/down-conversion.

Typically, a FH radio unit operating in standby mode sleeps most of the time, but periodically "wakes up" to listen on a certain hop channel for a page message. To obtain resistance against jammers, this hop channel is chosen differently at each wake-up instant. A FH radio that wants to page another radio unit in order to set up a connection does not know when and on what channel the other radio unit will wake up, so it has to send its page message repeatedly on many hop channels. There are many ways to do this, several of which are described in U.S. Pat. No. 5,940,431, entitled "Access Technique of Channel Hopping Communications System," by J. C. Haartsen and P. W. Dent, issued Aug. 17, 1999; and U.S. patent application Ser. No. 09/168,604, entitled "Access Technique of Channel Hopping Communications System," by J. C. Haartsen, filed Oct. 9, 1998, which are both hereby incorporated herein by reference in their entirety. Other methods can, for example, be found in the IEEE 802.11 WLAN standard. The access delay (e.g., the amount of time its takes to get two units to operate in hop synchronization) and the effort to get two units hop synchronized depends on the number of hop channels. Decreasing the number of hop channels would improve the access delay, but the rules for operating in the band substantially prevent the usage of only a small amount of hop channels (75 is the minimum number of hop channels that must be utilized in the U.S. according to FCC part 15).

Figure 3:
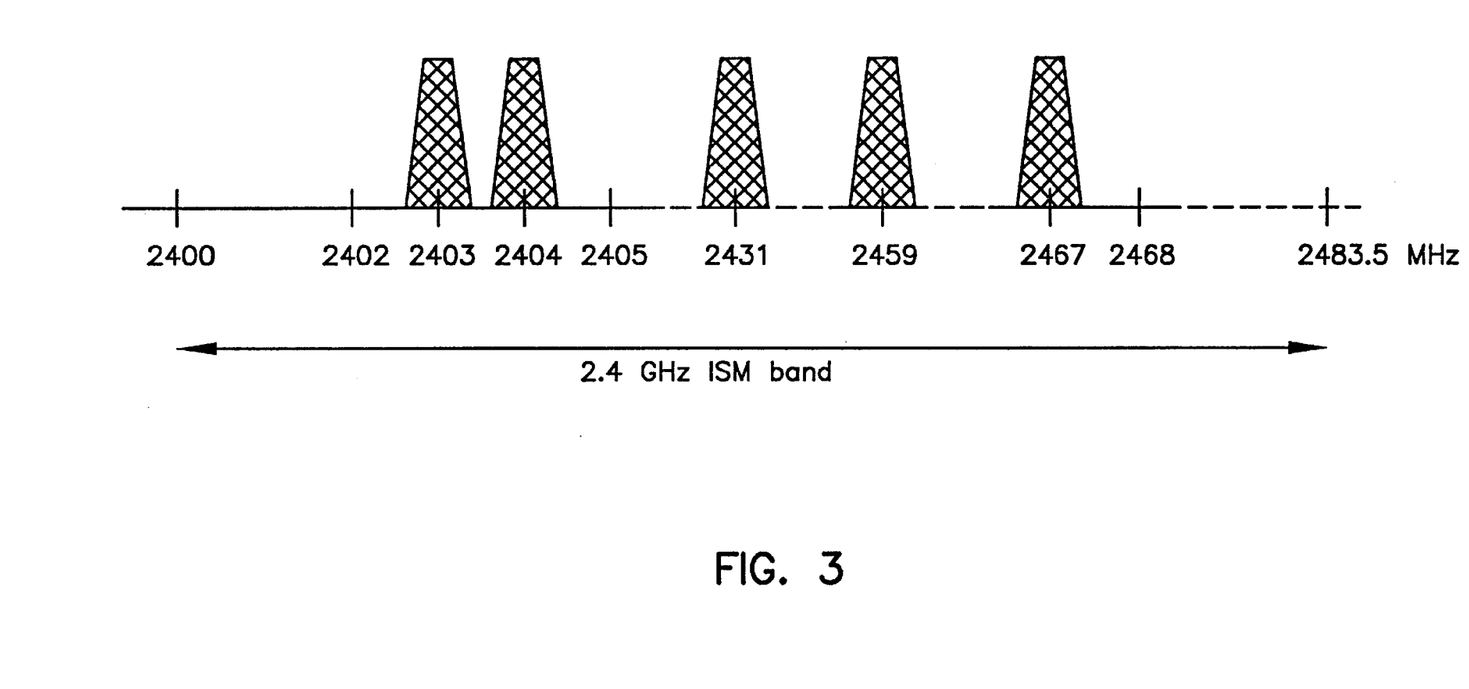
FIG. 3. is an example of startup carrier allocation in the 2.4 GHz ISM band in accordance with one aspect of the invention.

However, reduction of the number of hop channels is allowed if the processing gain at the receive side can be obtained in some other way, for example by DS spreading. A combination of FH and DS spreading is allowed as long as the combined processing gain is at least 17 dB. Such a hybrid system spreads its power by first multiplying each bit with a high-rate chip spreading code, and then hopping from time to time to a new hop frequency. Since the number of hop channels is only an issue during startup (because after frequency hop synchronization has been established, the number of hop channels to spread over is immaterial), DS spreading is applied only during startup in order to permit a temporary reduction of the frequency hop spreading while still obtaining sufficient spreading gain to comply with the FCC rules. The reduced set of hop frequencies used during startup can be an arbitrary selection out of the 79 hops defined in FIG. 1. FIG. 3 is an illustration of one such arbitrary selection. In this example, it is desirable to remain compatible with the hop allocation according to the IEEE 802.11 definition for FH systems. However, this need not be a limitation in all cases. In fact, a completely different set of hop channels can be defined in the 2.4 GHz band as long as the FCC part 15 rules are fulfilled. This selection can, for example, be based on an identity of a user or a network. Alternatively, selection of a reduced set of hop frequencies for use during paging can be based on intelligently avoiding jammers. For example, since microwave ovens operate in the region from about 2440 to 2480 MHZ, it may be advantageous to select the reduced set of FH channels from the lower end of the 2.4 GHz band.

During startup, signaling is used between the transmitter and the receiver in order to get them hop synchronized with respect to one another. By choosing an intelligent signaling scheme, the implementation of a complete DS spreader and despreader (including chip synchronization and tracking) can be avoided. Since the extra DS spreading is only required during startup, the DS operation should preferably be compatible with the FH radio transceiver implementation. This can be achieved by making the signaling rate during startup much lower than the data rate normally used in the FH transceiver. By considering the bits normally used by the FH radio as chips for the DS component, a processing gain is obtained by the difference between the chip rate and the signaling rate. This is accomplished as follows.

Figure 4:
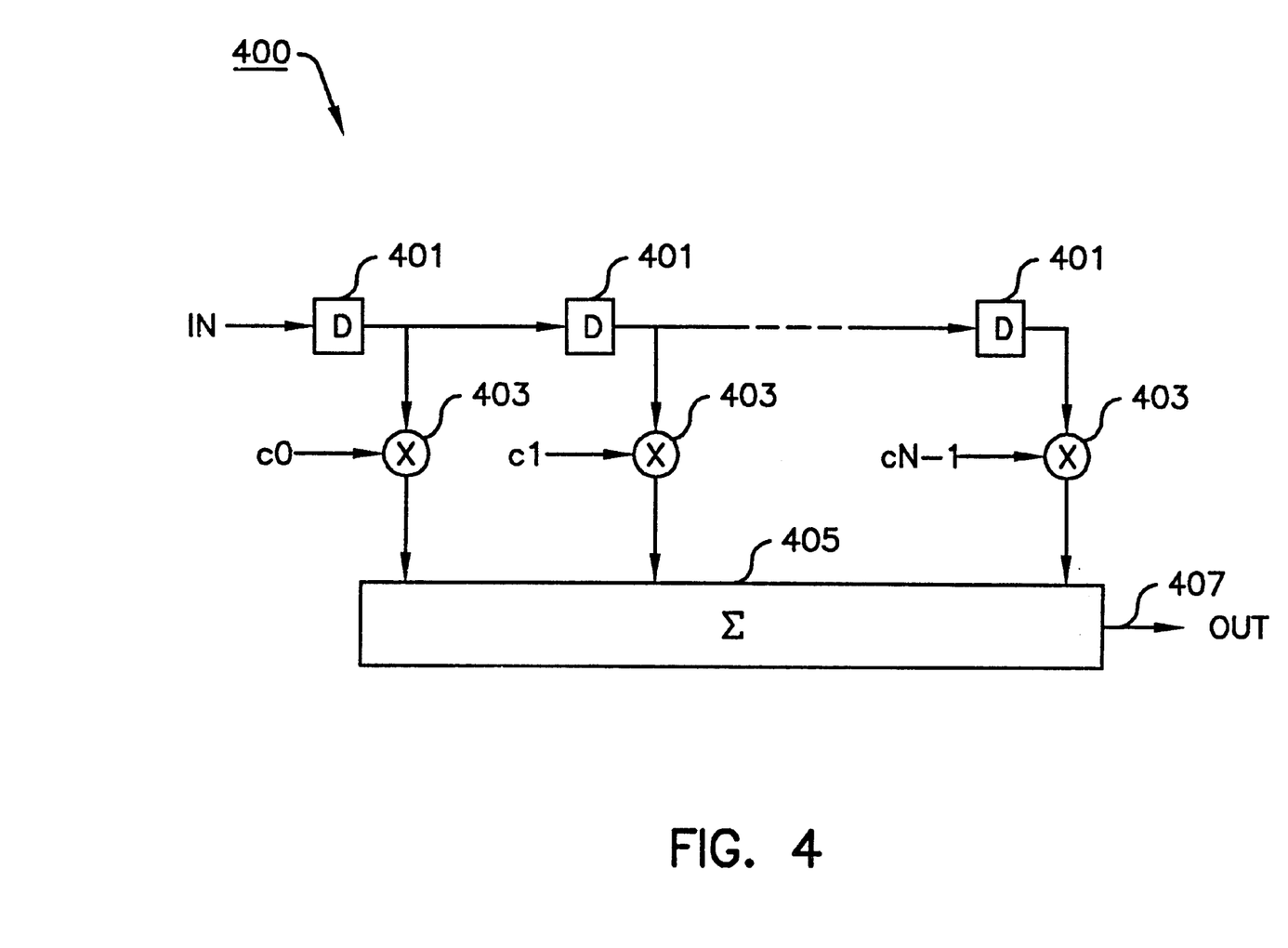
FIG. 4. is a block diagram of a sliding correlator for despreading a page message in accordance with an aspect of the invention.

During the startup, the paging unit transmits a page message in the form of a pseudo-random bit stream sent at the bit rate normally used in the connection mode (i.e., after the transmitter and receiver have hop synchronized with respect to one another). This page message forms the code of the DS radio transmission. The page message may be a fixed bit sequence, used by all radio units. Alternatively, it can be derived from an address of the unit (or the network) being paged. For example, each unit can have its own page sequence, and can be designed to respond only to this particular page sequence. As mentioned, the page message is sent at the bit rate that the FH radio normally uses. In the FH radio receiver, a sliding correlator is included that is matched to the code of the page message. A sliding correlator 400 can be built as a tapped delay line, as illustrated in FIG. 4. The delay line comprises a number, N, of series-connected delay elements 401, each delay element 401 introducing a delay of one bit duration (i.e., one chip duration for the DS component). Oversampling can be applied to obtain a higher time resolution. The delay line is tapped, and each tap is multiplied (e.g., by a corresponding one of N multipliers 403) by a corresponding one of N chip values, designated $c0$, $c1, \ldots, cN-1$. Each chip value takes on a value of +1 or −1. The tap outputs are accumulated in an adder 405. When the contents of the delay line match the chip values at the taps, the output 407 generated by the adder 405 reaches its maximum. This causes the correlator 400 to trigger (e.g., by comparison of the output 407 with a predetermined value), thereby indicating that a signal with the appropriate (matching) code has been found. The correlator 400 effectively despreads the page message.

Figure 5:
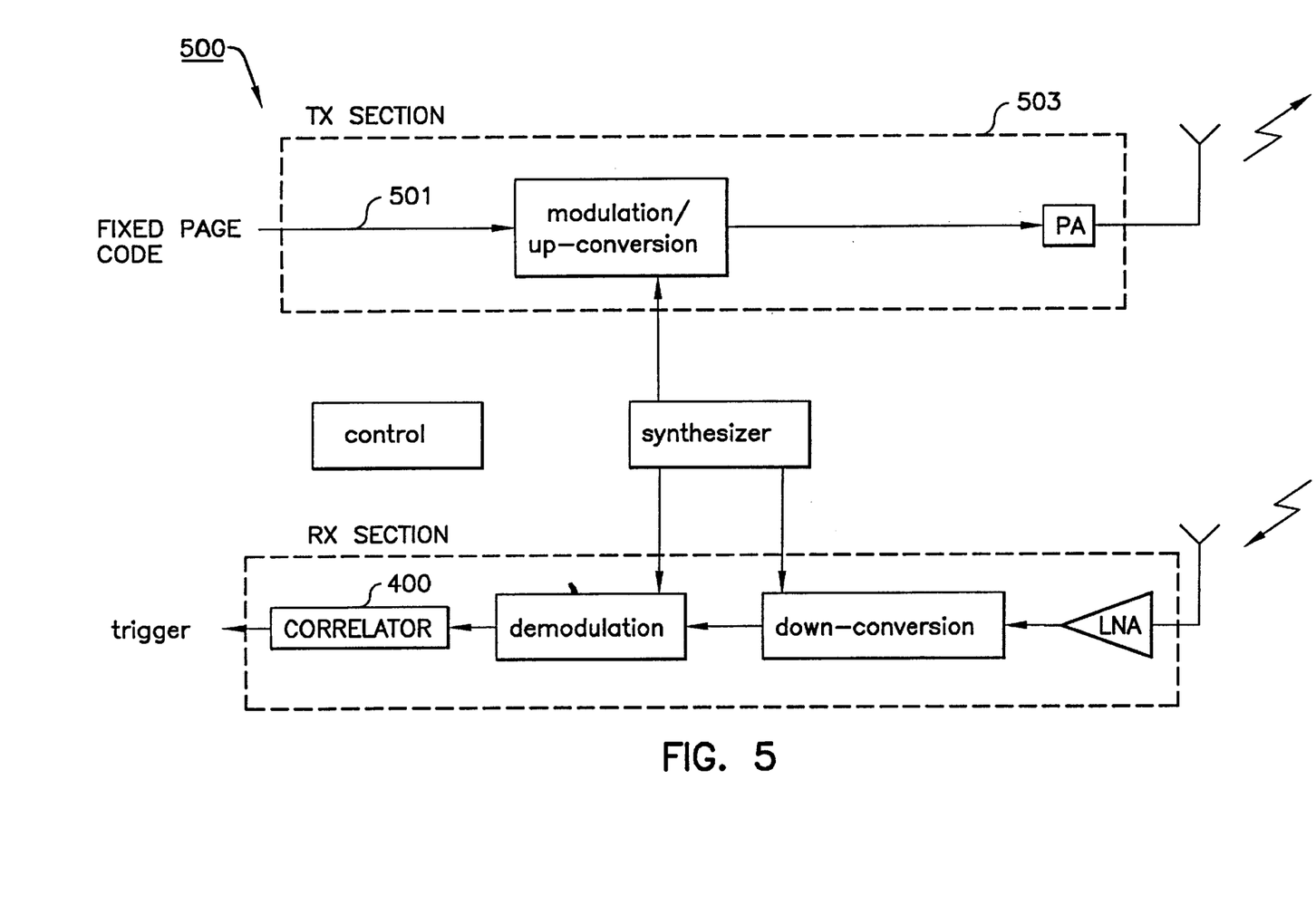
FIG. 5. is a schematic diagram of a transmitter and receiver for a DS/FH radio system used during startup in accordance with an aspect of the invention.

A preferred implementation of a FH radio transceiver 500 having a DS component for startup synchronization is shown in FIG. 5. The transceiver 500 is capable of paging another transceiver, and is also capable of being paged by another transceiver.

During paging, a paging unit (not shown) provides a fixed bit (i.e., chip) sequence 501 to the transmitter 503. The sequence 501 may be a fixed page code that is useful for paging any unit, or it may alternatively be a specific code for paging only a single unit (or a group of units). The sequence 501 is transmitted over the reduced set of FH channels, as explained earlier. The combination of reduced frequency hopping and direct sequence spreading provides the necessary processing gain to satisfy the applicable broadcast standards.

When the transceiver 500 is in standby mode, it sleeps most of the time, and wakes up periodically to listen on a certain hop channel for a page message. As mentioned earlier, the particular wake-up hop frequency preferably changes with each wake-up period, and in accordance with the invention is selected from the reduced set of FH channels that are used during paging operations. The transceiver 500 in standby mode correlates the received input data at the bit (i.e., chip) rate in the sliding correlator. When the output of the correlator 400 exceeds a certain value, the resultant triggering indicates to the transceiver 500 that it has been paged. The transceiver 500 may then return an acknowledgment to the paging unit.

Figure 6:
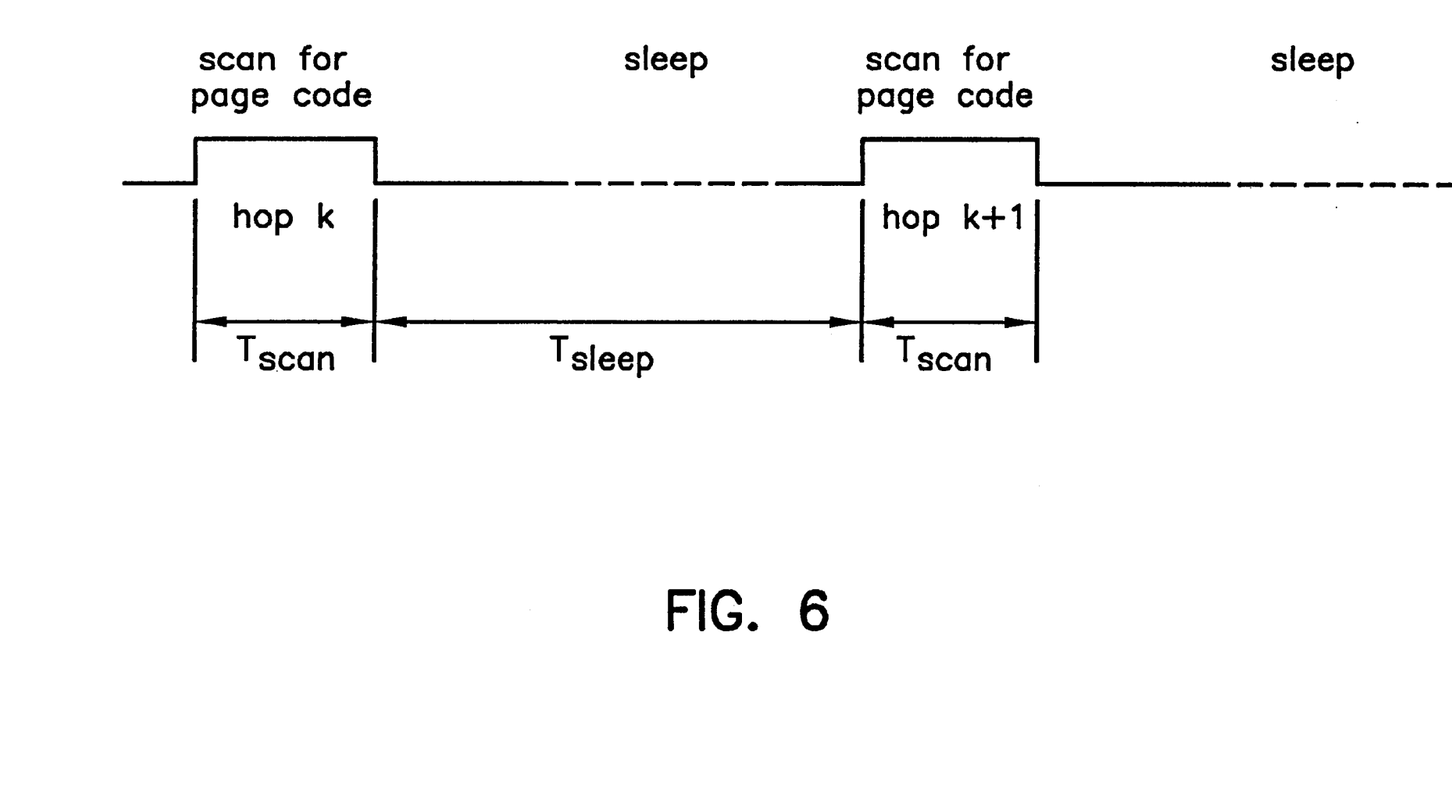
FIG. 6. is timing diagram showing the scan behavior of a DS/FH radio unit in standby mode in accordance with an aspect of the invention.
Figure 7:
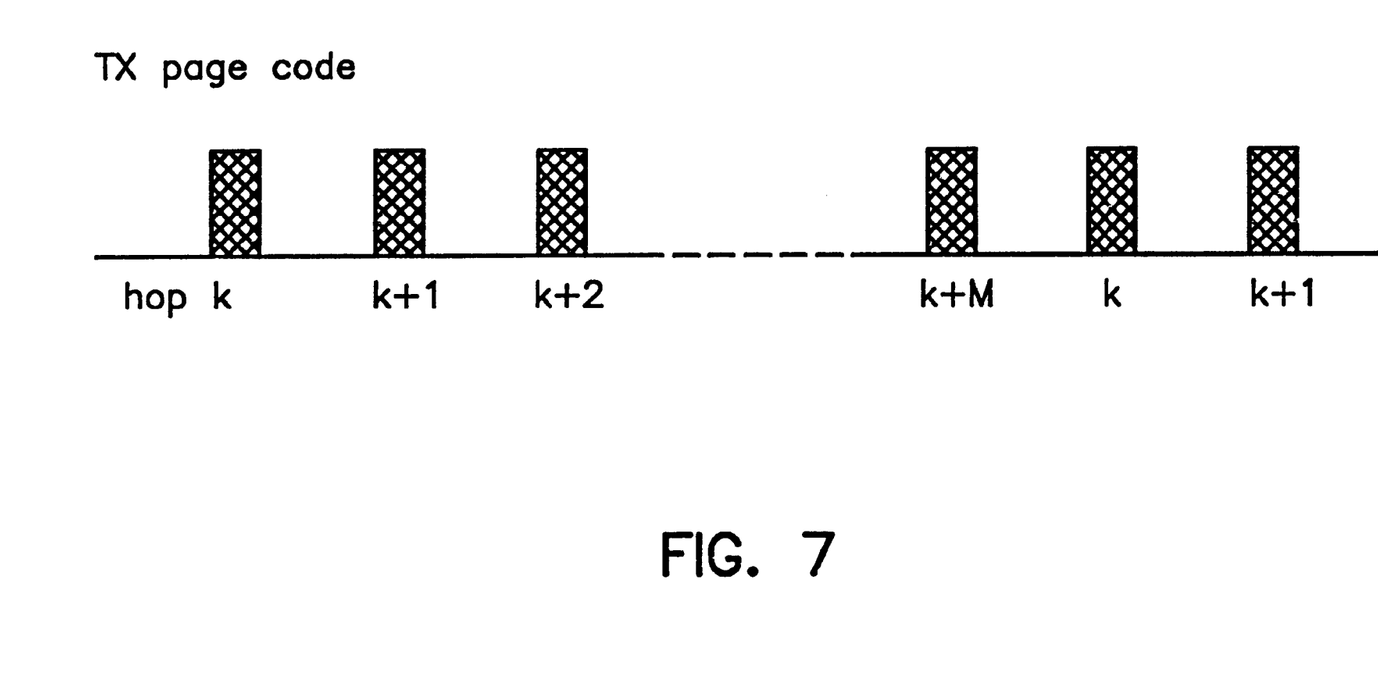
FIG. 7. is a timing diagram showing the transmit behavior of a DS/FH radio unit operating in page mode in accordance with an aspect of the invention.
Figure 8:
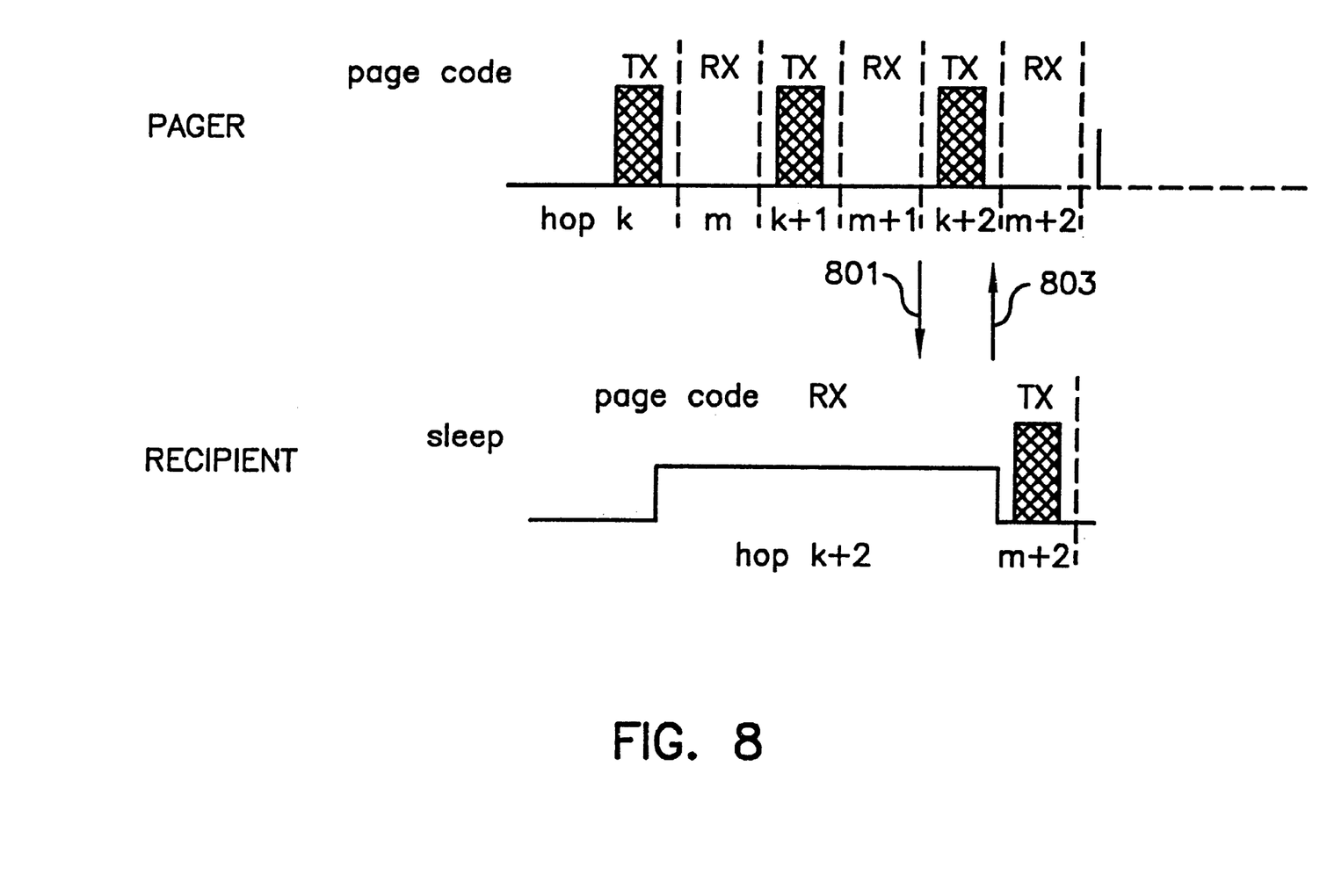
FIG. 8. is a timing diagram showing the information exchange that occurs during a page procedure in accordance with an aspect of the invention.

The operation of the paging procedure is further illustrated in FIGS. 6–8. The reader is also referred to the several applications, each entitled "Access Technique of Channel Hopping Communications System," mentioned and incorporated by reference above. A unit in standby mode wakes up after every time interval T_sleep and listens on a single hop frequency for a time duration designated T_scan. During each wake-up event, another hop frequency is selected from the reduced set of wake-up frequencies, as shown for example in FIG. 3. When the unit listens, all input signals are routed to the correlator 400 where the unit tries to match the input bit stream to the expected page message. If the correlator does not trigger during the scan period, the radio unit returns to sleep.

In order to increase the likelihood of synchronizing with the standby unit, the paging unit transmits the page message (which, in order to keep the complexity of the correlator low, can be quite short, for example, 64 bits or chips) sequentially at each of the various wake-up hop frequencies, as illustrated in FIG. 7 for the case of M hop frequencies used during paging. For this paging activity, the hop rate of the transmitter is increased such that many hop frequencies are visited during the T_scan period. Because the standby unit listens in on only one hop frequency during any one T_scan period, the paging unit's use of many hop frequencies during this same interval increases the probability that the paging unit will be heard by the standby unit. In order to ease implementation, the paging hop rate is preferably a multiple of the hop rate used during the connection mode when only FH is applied.

The paging is continued until either the recipient responds or a timeout is exceeded. In order to know whether the recipient has received the page message, the paging unit must repeatedly listen as well. In a preferred embodiment, DS spreading is used in the response message as well. This is accomplished by using a spreading code for both paging and responding. As shown in FIG. 8, when the recipient has received the page message (step 801), it returns a response message (step 803) which is correlated in the paging unit preferably by means of the same techniques as are used by the recipient to correlate a received signal with the paging message. Although this need not be the case in all embodiments, the contents of the response message can even be identical to the contents of the page message. After the transmission of each page message the paging unit listens at a corresponding frequency for a response message. For example, as shown in FIG. 8, after transmitting a page message on the frequency corresponding to hop k, the paging unit listens for a response on a corresponding frequency specified by hop m. When no response is detected, the paging unit next transmits a page message on the frequency corresponding to hop k+1, and then listens for a response on a corresponding frequency specified by hop m+1. During each listening interval, the paging unit routes any received signal to the correlator which is initialized with the response code. When the correlator 400 in the paging unit triggers, the paging unit knows that the intended recipient has received the page message and from that point both units are effectively in hop synchrony. From then on, communication between the units is no longer restricted to the reduced set of hop frequencies used for paging; instead, all the hop channels can be used. Furthermore, DS spreading need no longer be employed, since the use of the full set of hop frequencies will be adequate to provide the processing gain set by the applicable standard.

In the previous discussion, the hybrid FH/DS mode was used during the startup procedure. However, in accordance with another aspect of the invention, the hybrid mode can also be used in other procedures where only a low or moderate signaling rate is required while there is a preference for the reduction of the number of channels to hop over.

To summarize, then, the access delay in a FH system during start up can be decreased by reducing the number of frequencies used. However, this will also reduce the processing gain. In certain frequency bands, such as the ISM band at 2.4 GHz, decreasing the number of hop frequencies below a certain minimum is not permitted. In order to decrease the number of frequencies but retain the required processing gain, direct-sequence spreading is added to the system, thus resulting in a hybrid FH/DS system. However, in some embodiments, the DS spreading is used only during startup for the purpose of temporarily reducing the number of hop frequencies. After startup, the synchronization has been established and a large amount of hop channels can be used. Therefore, after startup, the DS spreading can be removed since all processing gain can be obtained from the FH spreading. Since the data rate during startup can be rather low (only signaling is required), no high speed circuitry is needed for the DS processing. Preferably, the chip rate of the DS spreading at startup is equal to the bit rate used during the connection. Since the signaling rate during startup is much smaller than the chip rate, a processing gain is obtained.

What is claimed is:

1. A radio system comprising:
   means for employing a hybrid frequency hopping/direct sequence spread-spectrum transmission mode of communication during startup of a connection; and
   means for employing a pure frequency hopping spread-spectrum transmission mode of communication during a connected mode of the connection.

2. The radio system of claim 1, wherein the means for employing the hybrid frequency hopping/direct sequence spread-spectrum transmission mode of communication during startup of the connection utilizes a chip rate that is identical to a bit transmission rate used by the pure frequency hopping spread-spectrum transmission mode of communication.

3. The radio system of claim 1, wherein the means for employing the hybrid frequency hopping/direct sequence spread-spectrum transmission mode of communication during startup of the connection includes means for transmitting a page message that comprises a fixed chip sequence that is unique to a radio unit being paged.

4. The radio system of claim 3, wherein a chip rate of the page message is identical to a bit rate used during the pure frequency hopping spread-spectrum transmission mode of communication.

5. The radio system of claim 1, wherein the means for employing the hybrid frequency hopping/direct sequence spread-spectrum transmission mode of communication during startup of the connection includes means for transmitting a page message that comprises a fixed chip sequence that is common to all radio units in the radio system.

6. The radio system according claim 5, wherein a chip rate of the page message is identical to a bit rate used during the pure frequency hopping spread-spectrum transmission mode of communication.

7. The radio system of claim 1, further comprising a sliding correlator for despreading a page message that is transmitted during startup of the connection.

8. The radio system of claim 7, wherein the sliding correlator is implemented as a tapped delay line.

9. The radio system of claim 1, wherein a processing gain of the hybrid frequency hopping/direct sequence spread-spectrum transmission mode of communication equals or exceeds 17 dB.

10. The radio system of claim 1, wherein a hop rate utilized by a paging unit operating in the hybrid frequency hopping/direct sequence spread-spectrum transmission mode of communication is a multiple of a hop rate utilized by the pure frequency hopping spread-spectrum transmission mode of communication.

11. The radio system of claim 1, wherein a hop sequence for use by the pure frequency hopping spread-spectrum transmission mode of communication comprises at least 75 hop frequencies.

12. The radio system of claim 1, wherein a first hop sequence for use by the hybrid frequency hopping/direct sequence spread-spectrum transmission mode of communication consists of fewer hop frequencies than are defined by a second hop sequence for use by the pure frequency hopping spread-spectrum transmission mode of communication.

13. The radio system of claim 12, wherein the hybrid frequency hopping/direct sequence spread-spectrum transmission mode of communication has a processing gain that equals or just exceeds 17 dB.

14. An apparatus comprising:
    means for employing a hybrid frequency hopping/direct sequence spread-spectrum mode of communication during a first mode of operation on a connection; and means for employing a pure frequency hopping spread-spectrum mode of communication during a second mode of operation of the connection, wherein a first hop sequence for use by the hybrid frequency hopping/direct sequence spread-spectrum mode of communication consists of fewer hop frequencies than are defined by a second hop sequence for use by the pure frequency hopping spread-spectrum mode of communication.

15. A method of operating a transceiver in a radio system, comprising the steps of:

employing a hybrid frequency hopping/direct sequence spread-spectrum transmission mode of communication during startup of a connection; and employing a pure frequency hopping spread-spectrum transmission mode of communication during a connected mode of the connection.

16. The method of claim 15, wherein the step of employing the hybrid frequency hopping/direct sequence spread-spectrum transmission mode of communication during startup of the connection comprises utilizing a chip rate that is identical to a bit transmission rate used by the pure frequency hopping spread-spectrum transmission mode of communication.

17. The method of claim 15, wherein the step of employing the hybrid frequency hopping/direct sequence spread-spectrum transmission mode of communication during startup of the connection includes transmitting a page message that comprises a fixed chip sequence that is unique to a radio unit being paged.

18. The method of claim 17, wherein a chip rate of the page message is identical to a bit rate used during the pure frequency hopping spread-spectrum transmission mode of communication.

19. The method of claim 15, wherein the step of employing the hybrid frequency hopping/direct sequence spread-spectrum transmission mode of communication during startup of the connection includes transmitting a page message that comprises a fixed chip sequence that is common to all radio units in the radio system.

20. The method of claim 19, wherein a chip rate of the page message is identical to a bit rate used during the pure frequency hopping spread-spectrum transmission mode of communication.

21. The method of claim 15, further comprising the step of using a sliding correlator to despread a page message that is transmitted during startup of the connection.

22. The method of claim 21, wherein the sliding correlator is implemented as a tapped delay line.

23. The method of claim 15, wherein a processing gain of the hybrid frequency hopping/direct sequence spread-spectrum transmission mode of communication equals or exceeds 17 dB.

24. The method of claim 15, wherein:

the step of employing the hybrid frequency hopping/direct sequence spread-spectrum transmission mode of communication during startup of the connection utilizes a first hop rate;

the step of employing the pure frequency hopping spread-spectrum transmission mode of communication during a connected mode of the connection uses a second hop rate; and the first hop rate is a multiple of the second hop rate.

25. The method of claim 15, wherein the step of employing the pure frequency hopping spread-spectrum transmission mode of communication during a connected mode of the connection uses a hop sequence that comprises at least 75 hop frequencies.

26. The method of claim 15, wherein:

the step of employing the hybrid frequency hopping/direct sequence spread-spectrum transmission mode of communication during startup of the connection utilizes a first hop sequence;

the step of employing the pure frequency hopping spread-spectrum transmission mode of communication during a connected mode of the connection uses a second hop sequence; and the first hop sequence consists of fewer hop frequencies than are defined by the second hop sequence.

27. The method of claim 26, wherein the hybrid frequency hopping/direct sequence spread-spectrum transmission mode of communication has a processing gain that equals or just exceeds 17 dB.

28. A method of operating a transceiver in a radio system, comprising the steps of:

employing a hybrid frequency hopping/direct sequence spread-spectrum mode of communication during a first mode of operation on a connection; and employing a pure frequency hopping spread-spectrum mode of communication during a second mode of operation of the connection, wherein a first hop sequence for use by the hybrid frequency hopping/direct sequence spread-spectrum mode of communication consists of fewer hop frequencies than are defined by a second hop sequence for use by the pure frequency hopping spread-spectrum mode of communication.

* * * * *